United States Patent [19]

Hazlett

[11] Patent Number: 5,254,385
[45] Date of Patent: Oct. 19, 1993

[54] ENCAPSULATED ASPHALT

[76] Inventor: Darren G. Hazlett, 4902 Dry Oak Trail, Austin, Tex. 78749

[21] Appl. No.: 709,298

[22] Filed: Jun. 3, 1991

[51] Int. Cl.$^5$ ............................................. B32B 5/16
[52] U.S. Cl. ...................................... 428/76; 428/403; 428/402.24; 428/407; 428/489
[58] Field of Search .................. 428/403, 407, 402.2, 428/402.21, 489, 402.24, 76; 208/44

[56] References Cited

U.S. PATENT DOCUMENTS

| | | | |
|---|---|---|---|
| 3,758,035 | 9/1973 | Ushiku | 241/73 |
| 3,869,417 | 3/1975 | Ramsay | 524/68 |
| 3,958,067 | 5/1976 | Takase et al. | 428/402 |
| 4,234,346 | 11/1980 | Latta | 106/281 R |
| 4,335,560 | 6/1982 | Robinson | 53/440 |
| 4,460,723 | 7/1984 | Rollmann | 524/70 |
| 4,873,275 | 10/1989 | Moran et al. | 524/64 |
| 5,019,610 | 5/1991 | Sitz et al. | 524/61 |

OTHER PUBLICATIONS

ASTM Designation: D 3381-83$^{E1}$, Standard Specification for Viscosity-Graded Asphalt Cement For Use in Pavement Construction.
AASHTO Designation: M 226-78, Standard Specification for Viscosity Graded Asphalt Cement.
Transportation Research Record No. 1342, Author-Joe W. Button, Title-"Summary of Asphalt Additive Performance at Selected Sites".
Canadian Technical Asphalt Association Proceedings-1986, Author-L. E. Moran Title-"Compatibility-The Key to Modified Asphalt Performance".
Asphalt Paving Technology 1991, Author-Tayebali et al., Title-"Relationships Between Modified Asphalt Binders Rheology and Binder Aggregate Mixtures Permanent-Deformation Response".
Asphalt Paving Technology 1991, Author-Rowlett, Title-"A Methodology for Evaluation of Performance-Based Tests Using Asphalt Modifiers".
Author-Joe Button, Title-"Methods to Determine Polymer Content of Modified Asphalt", Jan. 1991.
ASTM-June Meeting Agenda-1991.
Engineered Asphalt Products, Multigrade Modified Asphalt Cement Seminar Agenda.
Suit-Kote company literature.
Fina Oil and Chemical product literature, "Polymerized Asphalts—Putting the Stick'em Back in Asphalt".
Elf Aquitaine Asphalt product literature, "Styrelf-The Asphalt for Today's Hot Mix—Performance for the Long Road".
Shell Chemical Company product literature, "Inroads" vol. 5, No. 2, 1992.

Primary Examiner—Paul J. Thibodeau
Assistant Examiner—H. Thi Lê

[57] ABSTRACT

This invention provides an encapsulated asphalt which is comprised of an asphalt cement or modified asphalt cement encapsulated by a polymeric coating (examples: ethylene vinyl acetate copolymer, ethylene-acrylic acid copolymer, polyethylene, polypropylene, etc.). The pellet of encapsulated asphalt is of such a size that it may be handled transported and stored at ambient temperatures and in much the same manner as grain, aggregate, or other granular materials. The encapsulated asphalt cement or modified asphalt cement will not suffer from degradation due to prolonged storage. The polymeric coating material and thickness may be chosen such that the coating will not alter the asphalt properties significantly, or may be used as a modifier for the asphalt which will be incorporated into the asphalt at the point of use.

4 Claims, No Drawings

ENCAPSULATED ASPHALT

BACKGROUND

1. Field of the Invention

This invention relates to asphaltic materials, in particular to a type of packaging for asphalt cements and modified asphalt cements for storage and use.

2. Discussion of Prior Art

Asphalt is a very versatile construction material which has been in use for thousands of years. There are several disadvantages to the current methods of handling and using asphalt. This is because the properties of asphalt are affected by time and environment.

Asphalt cement, which is usually a semi-solid material at room temperature, is conventionally obtained as the residual material from refining of crude petroleum. As such it is produced at elevated temperatures. It must be maintained at elevated temperatures for transfer to storage tanks and any transfer from one container to another until ultimate use. Most uses of asphalt cement require elevated temperatures for application. Most asphalt cement must therefore be maintained at elevated temperatures from the time of manufacture to the time of use. Significant amounts of energy in the form of heat must be expended in order to maintain the asphalt in a fluid state. Also, the properties of the asphalt cement can be adversely effected by prolonged storage at elevated temperatures.

SOME ASPHALT USES

Asphaltic Concrete Paving

One significant use for asphalt cement is in the production of asphaltic concrete for use as paving material. In this process, the heated (fluid) asphalt cement is pumped into a mixing device where it is brought into contact with hot aggregate particles in a turbulent mixing environment. The fluid asphalt cement, which remains fluid due to the aggregate temperature, coats the aggregate particles. This material, known as hot mix asphaltic concrete (HMAC), is used as paving material. It is transported to the point of use, spread uniformly over the intended surface, and compacted to form a dense layer. When the asphaltic concrete cools, the asphalt cement returns to a viscous semi-solid material which functions as a binder for the aggregates. The resulting pavement can then support loads.

The manner in which an asphalt's viscosity changes with temperature can significantly effect the behavior of the pavement made with that asphalt.

Thermal cracking can develop when an asphalt becomes too viscous at low pavement service temperatures. The asphalt may become so viscous that is can not accommodate the stress induced by the restrained thermal contraction of the pavement aggregates and result in a crack in the pavement due to a tensile failure in the asphalt cement.

Rutting may develop in a pavement if the asphalt is not viscous enough (is too fluid) at high pavement service temperatures. The asphalt cement can not bind the aggregates together well enough to support loads without permanent deformation. This permanent deformation forms a rut in the pavement at the loading point (wheel path).

Road Surfacing

Asphalt is also used for roads in the process known as seal coating or chip sealing. In this process fluid asphalt (hot asphalt cement) is applied to the existing road surface and aggregates are applied on top of the asphalt. The aggregates are rolled into the asphalt to aid adhesion. When the asphalt cools and the viscosity increases, the aggregate is held in place by the asphalt resulting in a more waterproof, skid resistant surface. If the asphalt becomes too viscous (brittle) at low pavement temperatures, the asphalt may fracture under traffic loading, resulting in aggregate particles being lost from the surface lowering skid resistance and possible vehicle damage from flying aggregate. If the asphalt becomes too fluid a high pavement temperatures, the aggregate may not be held sufficiently to the pavement and be removed from the pavement by traffic action or further embedded in the asphalt and underlying pavement resulting in a rich asphalt surface having reduced skid resistance and a pavement more prone to permanent deformation.

Roofing

Another significant use of asphalt occurs in roofing. In the typical process, asphalt is hot applied to the surface of the roof structure and aggregate (rocks) are embedded in the surface. The resultant coating is waterproof and resistant to environmental stresses. Asphalt which is too viscous (brittle) at low service temperatures may be prone to cracking and result in the loss of the waterproofing characteristics of the coating. Asphalt which is too fluid (not viscous enough) at high service temperatures may flow, resulting in a reduction of the waterproofing characteristics and possibly marring the appearance of the building.

Asphalt Modification

Many polymers have been added to asphalt in an attempt to change the viscosity-temperature relationship of asphalt to preclude having too high or too low asphalt viscosity in the operating temperature range for a particular asphalt use. Some polymers address one or both of these problems. The polymers used to modify the asphalt viscosity-temperature relationship can generally be classified as either thermoplastics, elastomers (rubbers), or polymers designed to have some properties of both. Polymers or chemicals can also be added to asphalt to address other asphalt service problems, such as to promote the asphalt aggregate bond in the presence of water or to prevent deterioration (oxidation, polymerization, or decomposition) of the asphalt cement in service. To be effective, polymers and/or chemicals must be dispersed uniformly throughout the asphalt. Many of these polymers and chemicals will degrade, decompose, or experience a reduction in effectiveness with prolonged storage in hot asphalt cement. This degradation process is a function of temperature and time. The higher the temperature of the asphalt-polymer/chemical blend, the faster the degradation reaction proceeds. Reducing the temperature to ambient, will essentially cease or greatly retard degradation. Additionally, some polymers and chemicals will separate from the asphalt cement without constant agitation of the fluid blend. There is a reduction in separation as the viscosity of the blend increases (temperature goes down).

In order to distinguish between production asphalts and asphalts to which polymers or chemicals have been added, the following definition will be used. An asphalt, to which has been added any chemical species not naturally occurring in asphalt or in quantities not normally found in asphalt refined from crude petroleum will be defined as a modified asphalt.

SUMMARY

In summary, there are several disadvantages to the current methods of handling and using asphalt cements and modified asphalt cements. They are:

1) energy expended (wasted) in maintaining asphalt cements and modified asphalt cements in a fluid state during storage and transportation before final use, 2) degradation of asphalt cement when it is maintained at elevated temperatures for prolonged periods of time, 3) possible degradation of the properties of modified asphalt cement when it is stored at elevated temperatures for prolonged periods of time, and 4) possible separation of the "modifier" in a modified asphalt cement when maintained in a fluid state without constant agitation.

PRIOR ART (PATENTS)

In U.S. Pat. No. 3,958,067, a granulated asphalt product is described. The product consists of an asphaltic material which has been processed by a special crushing apparatus resulting in small, irregular shaped asphalt particles. Stated uses for the product include paving, sealing, asphalt tile, asphalt roofing, water-proofing, tarpaulin paper, etc. The advantages claimed for this product are energy savings and ease of melting at the point of use. The ease of melting is a function of the increased surface area of the product and consequent increased heat transfer available. The energy savings is based on the absence of the need to maintain the asphaltic product in a fluid state by the use of added heat until the point of product use. Asphalts used in highway construction, meeting ASTM D 3381 or AASHTO M226, would require bulk storage of granulated asphalt at below ambient temperatures to prevent the semi-solid asphalt granules from adhering to each other and forming agglomerated particles or coalescing to form a mass. U.S. Pat. No. 3,958,069 does not indicate how granular paving grade asphalt remains granular at ambient temperatures without coalescing. For other described uses, unless the asphalt used had reduced adhesive properties, the material could be subject to the same agglomeration problems.

U.S. Pat. No. 3,958,069 is a continuation-in-part of U.S. Pat. No. 3,783,000. Examples presented in U.S. Pat. No. 3,783,000 indicate that granular paving asphalt is a blend of approximately 50% asphalt and 50% limestone dust as a filler. It is this addition of limestone dust, or filler, which reduces the the adhesive properties of the granular asphalt so it will not agglomerate or coalesce at ambient temperatures. This means anytime granular paving asphalt is used, limestone dust (filler) must be accommodated in the product. For many applications, including hot mix asphaltic concrete, the use of limestone dust filled asphalt would require costly changes to other component materials to enable the aggregate gradation to accomodate the additional fine material. Too much fine material may be detrimental to mixture properties. The use of granular paving asphalt, containing limestone dust filler, would also increase the cost of hot mix asphaltic concrete because of the added expense for transporting the limestone dust. These considerations make a granular asphalt produced from asphalt and limestone dust (filler) undesirable to use.

In U.S. Pat. No. 4,335,560, a method for containerizing asphalt is described. The method described is for placing molten specialty asphaltic materials into manually handleable packages for economical shipment to jobsites. Materials identified to be packaged in this manner are those materials used in small quantities, where shipment to jobsites in bulk storage tanks is not feasible. Containers are constructed by using a corrugated cardboard box to support an open top, thin walled, plastic container. The containers are filled with molten asphaltic material from a dispenser vehicle. The closed corrugated cardboard box, containing the desired number of asphaltic material filled compartments, is then closed and equipment necessary for the total filling-shipping system. The thin walled plastic container serves to form manually handleable packages of the asphaltic material which can be removed from the cardboard box at the jobsite and placed in a heating device to melt and use. In this containerizing and shipping system, the thin walled plastic container is melted along with the product for use. The volumes of plastic to asphaltic material are such that the plastic is "lost" in the large volume of asphaltic material during melting. The plastic container material does not influence the properties of the usable asphaltic material.

SUMMARY OF INVENTION, OBJECTS AND ADVANTAGES

This invention relates to the encapsulation of discrete quantities of bituminous material (asphalt cement or modified asphalt cement) by a coating which will prevent separate asphalt elements from agglomerating, adhering, or coalescing to form larger masses of asphaltic material. The encapsulated bituminous material elements should be small enough so they may be handled, transported, and stored as a granular solid. The encapsulant material will be either incorporated into the bituminous material or become an inert component of the final product during the ultimate use of the bituminous material.

The encapsulant can be chosen from any one of a number of polymers or chemicals which may or may not affect the properties of the encapsulated bituminous material. The amount of the encapsulant to be dispersed into the bituminous material or incorporated into the final use of the bituminous material may be varied by the thickness of the coating used. By varying the bituminous material, the encapsulant material, and encapsulant quantity one may develop the following encapsulated bituminous products.

Using small amounts (thin coatings) of an encapsulant material chosen to have immeasurable effects on the bituminous material's properties, one may manufacture an encapsulated asphalt cement. This asphalt will not need storage at elevated temperature. The result is an asphalt cement not subject to property degradation due to prolonged storage at elevated temperatures and a savings of the energy required for hot storage of the asphalt as a fluid. In addition, the capital expense for heated storage tanks can be reduced to the protected storage requirements of a granular solid. Also, producers of asphalt cement can adjust seasonal production rates to accommodate high demand periods and alleviate short supply since the encapsulated asphalt could be stockpiled indefinitely.

Using small amounts (thin coatings) of an encapsulant material chosen to have immeasurable effects on the bituminous material properties, one may manufacture an encapsulated modified asphalt cement. Encapsulated modified asphalt cements have the same benefits as those stated above for asphalt cements and several others affecting modified asphalts. As stated previously, the properties of many modified asphalts degrade with prolonged storage at elevated temperatures due to the degradation or reaction of the modifier. Since storage at elevated temperature is eliminated, any degradation or reaction of modifiers with themselves or the asphalt virtually ceases. Modifier separation virtually ceases at lower temperatures also as the viscosity of the modified asphalt increases to preclude gross molecular movements. If modifier separation were to occur before viscosity increases reduced separation, using the case of carbon black in asphalt cement as an example of a modifier prone to separation, the separation would only be on a the capsule scale, not on the macroscopic bulk material scale and therefore not adversely affect the properties of modified asphalt in its end use.

An encapsulant material may be chosen with properties and/or used in quantities to provide not only the encapsulation effect, but also may in itself modify an asphalt cement or further modify a modified asphalt cement. An example of this use is the encapsulation of an asphalt cement using an ethylene-acrylic acid copolymer, polypropylene, or ethylene-vinyl acetate copolymer as the encapsulant. These materials can be incorporated into the asphalt as a modifier during ultimate use.

Accordingly, I claim the following as objects and advantages of the invention: to provide an encapsulated asphalt cement and/or modified asphalt cement which eliminates the energy consumption resulting from hot storage, to provide an encapsulated asphalt cement and/or modified asphalt cement which reduces or eliminates the degradation of desired properties due to prolonged storage at elevated temperatures, to provide an encapsulated modified asphalt cement which reduces or eliminates the separation of modifiers from the bulk asphalt, to provide an encapsulated asphalt cement and/or modified asphalt cement in which the encapsulant becomes a modifier or additional modifier in the product, and to provide an encapsulated asphalt cement and/or modified asphalt cement which can be treated as a granular solid during handling, storage, and transportation.

DESCRIPTION OF THE PREFERRED EMBODIMENTS

After an asphalt or modified asphalt has been produced, molten asphaltic material is encapsulated inside a polymeric coating. The capsule may be formed by heat sealing a film or tube shape of the desired polymeric material to form a three sided container or pouch. Molten asphaltic material can then be used to fill the void in the polymeric container. The remaining opening of the container may then be closed by heat sealing. The capsules containing molten asphaltic material are then cooled. The capsules become discrete units of asphaltic material which will not agglomerate or adhere to one another. If the capsules of asphaltic material are small enough they may be stored, handled and transported as a granular material. The polymeric coating may be chosen from any polymer which is suitable to the heat sealing process. The polymer may be chosen by chemical structure or film thickness to either be incorporated into the asphaltic material as an asphalt modifier or inert ingredient during final use of the product.

CONCLUSION AND SCOPE OF INVENTION

The reader can see that the encapsulated asphalt of this invention provides a mechanism to: protect an asphaltic material from heat degradation; simplify storage, transportation and handling; eliminate energy consumption and provide a greater degree of safety during storage; prevent separation of preblended polymers; and if desired, modify asphalt properties during final use. This invention can change the way asphaltic materials are presently handled.

While the above description contains many specificities, these should not be construed as limitations on the scope of the invention, but rather as an exemplification of one preferred embodiment thereof. Other variations are possible. For example there may be other ways to contain a small volume of asphalt in a polymeric film coating besides the heat sealing method described above. Accordingly, the scope of the invention should be determined not by the embodiments illustrated, but by the appended claims and their legal equivalents.

I claim:

1. Encapsulated asphalt articles consisting of asphalt-containing polymer capsules, having asphalt inside a polymer cover, said capsules being processable as granular solids comprising in combination:
   a) an interior of asphaltic or modified asphaltic material, which is encapsulated within
   b) a polymer or copolymer encapsulant, wherein said encapsulant covers said asphaltic material in a continuous coating, said capsules being non-adherent to one another at room temperatures.

2. The asphalt articles of claim 1 wherein said asphaltic material is a modified asphalt.

3. The asphalt articles of claim 1 wherein said polymer or copolymer forming the encapsulant and the thickness of the encapsulating coating are chosen such that upon incorporation of the encapsulating polymer or copolymer into the asphalt material during use of the capsules, the asphaltic material is modified by the encapsulant.

4. The asphalt articles of claim 1 wherein said polymer or copolymer forming the encapsulant and the thickness of the encapsulating coating are chosen such that upon incorporation of the encapsulating polymer or copolymer during use of the capsules, the properties of the asphaltic material remain substantially unchanged.

* * * * *